(12) United States Patent
Kamata et al.

(10) Patent No.: US 7,057,625 B2
(45) Date of Patent: Jun. 6, 2006

(54) PROGRAM AND APPARATUS FOR DISPLAYING GRAPHICAL OBJECTS

(75) Inventors: Seiichi Kamata, Kawasaki (JP); Fujio Sato, Kawasaki (JP); Yukio Hirayama, Kawasaki (JP); Keisuke Imaizumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 158 days.

(21) Appl. No.: 09/968,520

(22) Filed: Oct. 2, 2001

(65) Prior Publication Data

US 2002/0190989 A1  Dec. 19, 2002

(30) Foreign Application Priority Data

Jun. 7, 2001  (JP) .............................. 2001-172846

(51) Int. Cl.
G09G 5/22 (2006.01)

(52) U.S. Cl. ........................ 345/592; 345/440; 345/419

(58) Field of Classification Search ................ 345/592, 345/781, 472, 440, 589, 419, 581; 348/333.12
See application file for complete search history.

(56) References Cited

U.S. PATENT DOCUMENTS

| | | | | |
|---|---|---|---|---|
| 5,751,289 | A | * | 5/1998 | Myers ........................ 345/419 |
| 6,157,387 | A | * | 12/2000 | Kotani ........................ 345/589 |
| 6,339,430 | B1 | * | 1/2002 | Takeshita .................... 345/592 |
| 6,377,277 | B1 | * | 4/2002 | Yamamoto ................... 345/629 |
| 6,411,294 | B1 | * | 6/2002 | Furuhashi et al. ........... 345/421 |
| 2003/0011610 | A1 | * | 1/2003 | Kitsutaka ..................... 345/582 |

OTHER PUBLICATIONS

Exploiting interactivity, influence, space and time to explore non-linear drama in virtual worlds Mike Craven, Ian Taylor, Adam Drozd, Jim Purbrick, Chris Greenhalgh, Steve Benford, Mike Fraser, John Bowers, . . . Mar. 2001.*

3D behavioral modes design for simulation and software engineering;Proceedings of the fifth symposium on Virtual reality modeling language (Web3D-VRML)Monterey, California, United States pp.: 7-16 Year of Publication: 2000.*

(Continued)

Primary Examiner—Michael Razavi
Assistant Examiner—Javid Amini
(74) Attorney, Agent, or Firm—Stass & Halsey LLP

(57) ABSTRACT

A program and apparatus which draw and display images of graphical objects, enabling their smooth and continuous transition from visible state to invisible state. For each given object, its distance from the current eye point is calculated for comparison with a predetermined semi-transparent distance, as well as with a predetermined invisible distance which is longer than the semi-transparent distance. The object is selected as a visible object that is to be subjected to image drawing operations if the above comparison has revealed that the calculated distance is shorter than the invisible distance. An image of the visible object is drawn in opaque mode if the distance is shorter than the semi-transparent distance, or in semi-transparent mode if the distance is longer than the semi-transparent distance. The resultant image is then displayed on a monitor screen.

15 Claims, 19 Drawing Sheets

OTHER PUBLICATIONS

Revealing the realities of collaborative virtual reality Mike Fraser, Tony Glover, Ivan Vaghi, Steve Benford, Chris Greenhalgh, Jon Hindmarsh, Christian Heath Sep. 2000.*

The relative contributions of stereo, lighting, and background scenes in promoting 3D depth visualization Geoffrey S. Hubona, Philip N. Wheeler, Gregory W. Shirah, Matthew Brandt Sep. 1999.*

Semantic depth of field, Kosara, R.; Miksch, S.; Hauser, H.; Information Visualization, 2001. INFOVIS 2001. IEEE Symposium on Oct. 22-23, 2001 pp.: 97-104.*

An experimental evaluation of transparent user interface tools and information content Beverly L. Harrison, Gordon Kurtenbach, Kim J. Vicente, Dec. 1995. □□.*

High-quality pre-integrated volume rendering using hardware-accelerated pixel shading Klaus Engel, Martin Kraus, Thomas Ertl □□Aug. 2001. □□.*

Real-time techniques for 3D flow visualization Anton Fuhrmann, Eduard Gröller Oct. 1998. □□.*

Time critical rendering: Fast perception-based depth of field rendering Jurriaan D. Mulder, Robert van Liere, Oct. 2000.*

Modeling motion blur in computer-generated images Michael Potmesil, Indranil Chakravarty, Jul. 1983.*

Transparent layered user interfaces: an evaluation of a display design to enhance focused and divided attention Beverly L. Harrison, Hiroshi Ishii, Kim J. Vicente, William A. S. Buxton, May 1995.*

* cited by examiner

111 VIEW PARAMETER DATABASE

| EYE POINT COORDINATES  E | (Ex,Ey,Ez) |
|---|---|
| LINE-OF-SIGHT VECTOR  V | (Vx,Vy,Vz) |
| UP VECTOR  U | (Ux,Uy,Uz) |
| PROJECTION PLANE'S DISTANCE FROM EYE POINT | D |
| PROJECTION PLANE'S NORMAL VECTOR  Sn | (Sx,Sy,Sz) |
| WINDOW SIZE | Wx,Wy |

PROGRAM AND APPARATUS FOR DISPLAYING GRAPHICAL OBJECTS

BACKGROUND OF THE INVENTION

1. Field of the Invention

The present invention relates to a program and apparatus which display graphical objects moving in a three-dimensional virtual space, and more particularly to a program and apparatus which draw and display graphical objects whose distance from an eye point is varied.

2. Description of the Related Art

There are simulation systems that reproduce a city street or other environment within a computer system by arranging many graphical objects in a three-dimensional virtual space. The computer calculates perspective projection views of those objects in reference to a given eye point in the created virtual environment, thereby displaying realistic images on its monitor screen. Some applications involve animated motions in a three-dimensional environment. More specifically, motion pictures are created by varying the eye point location and line of sight according to the instructions from an operator.

Motion video is a time series of discrete pictures, meaning that the computer has to produce an updated picture at predetermined intervals. Typical video monitors operate at a refreshing rate of 60 frames per second, in which case the computer should generate an image of every object images within a sixtieth second. Redrawing many objects in such a short period could be a heavy burden to the computer. In some critical situations (depending on the number of objects to be drawn and the complexity of each object), the computer may fail to handle all objects within a required time.

Researchers have proposed several methods to alleviate such processing workloads in the process of video frame generation. One simplest and widely-used way to achieve this is such that graphical objects are not drawn when they look small in the picture being produced. The disadvantage of this method is that a transition of an object from visible state to invisible state occurs suddenly. This discontinuity would be perceived by the audience as an unnatural effect on a video screen that they are watching.

One method to address the above problem is to draw an object not necessarily in full detail, but in a simplified shape, depending on the size of its projected image. This geometrical simplification is gradually applied to an object disappearing from sight. Besides alleviating the computer's processing loads, the method reduces the undesired effect stated above. FIG. 19 shows an example of such a conventional graphic representation technique which varies the resolution of an object in a stepwise manner.

Shown in FIG. 19 are three geometry models representing the same object with different resolutions. The left-most shape in FIG. 19 depicts the original geometry data 301, which contains every detail of the object. The next shape represents "level-1 geometry model" 302 which is close to the original geometry data 301, but lacks some details. The right-most shape shows "level-2 geometry model" 303 which is coarser than the level-1 geometry model 302.

More specifically, the original geometry model 301 has some fine features including a curved surface. This model 301 is subjected to the image drawing process when the object is located close to the current eye point. The level-1 geometry model 302 represents the object as a combination of simple boxes, every surface of which is flat. Because the curved surface is eliminated, this level-1 geometry model 302 only requires a smaller amount of computation than the original geometry data 301 when the computer produces the image of the object. This model 302 is used when the object is relatively distant from the eye point. The level-2 geometry model 303 is a single box. Compared to the level-1 geometry model 302, this level-2 geometry model 303 is easier to draw, because the number of surfaces is reduced to six. This most simplified model 303 is used when the object is far from the eye point.

As illustrated in FIG. 19, the system stores a plurality of geometry models representing the same object with different resolutions, so that an appropriate model will be selected according to the distance between the current eye point and the object of interest. As the object moves away from the eye point, the system switches the model to a coarser one, thereby alleviating the processing workload to produce a new frame picture within a limited period.

The above-described variable resolution method would serve the purpose effectively in such applications as video games in which the geometry data of graphical objects are previously defined and fixed. However, the method is not suitable for CAD applications, for example, because geometry data is so frequently changed in the course of design engineering that it is not easy to prepare different versions of geometry data each time an object is modified. Take a design engineering process of buildings, for example. In this process, an architect creates a model and checks their appearance in a three-dimensional virtual city environment. The detailed design of the buildings are always subject to change, but it is not efficient for him/her to recreate additional versions of building objects each time he/she modifies the design.

SUMMARY OF THE INVENTION

In view of the foregoing, it is an object of the present invention to provide a program and apparatus which create a smooth and continuous transition of graphical objects from their visible state to invisible state, or vise versa.

To accomplish the above object, according to the present invention, there is provided a program product, for use with a computer, for drawing and displaying an image of given objects in a three-dimensional virtual space. This program product causes the computer to perform the steps of: (a) calculating distance from an eye point to an object; (b) comparing the distance calculated at the calculating step (a) with a predetermined semi-transparent distance, as well as with a predetermined invisible distance which is longer than the semi-transparent distance; (c) selecting the object as a visible object that is to be subjected to image drawing operations if the comparing step (b) has revealed that the distance of the object is shorter than the invisible distance; (d) drawing an image of the visible object, in opaque mode if the comparing step (b) has revealed that the distance is shorter than the semi-transparent distance, or in semi-transparent mode if the comparing step (b) has revealed that the distance is longer than the semi-transparent distance; and (e) displaying the image of the visible object drawn at the drawing step (d).

Further, to accomplish the above object, there is provided an apparatus for drawing and displaying an image of given objects in a three-dimensional virtual space. This apparatus comprises the following elements: (a) a distance calculator which calculates the distance from an eye point to an object; (b) a transparency evaluator which compares the calculated distance with a predetermined semi-transparent distance, as well with a predetermined invisible distance which is longer than the semi-transparent distance; (c) a drawing processor which selects the object as a visible object that is to be subjected to image drawing operations if the distance is shorter than the invisible distance, and draws an image of the visible object in opaque mode if the distance is shorter than the semi-transparent distance, or in semi-transparent mode if the distance is longer than the semi-transparent distance; and (d) a display processor which displays the image of the visible object drawn by the drawing unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
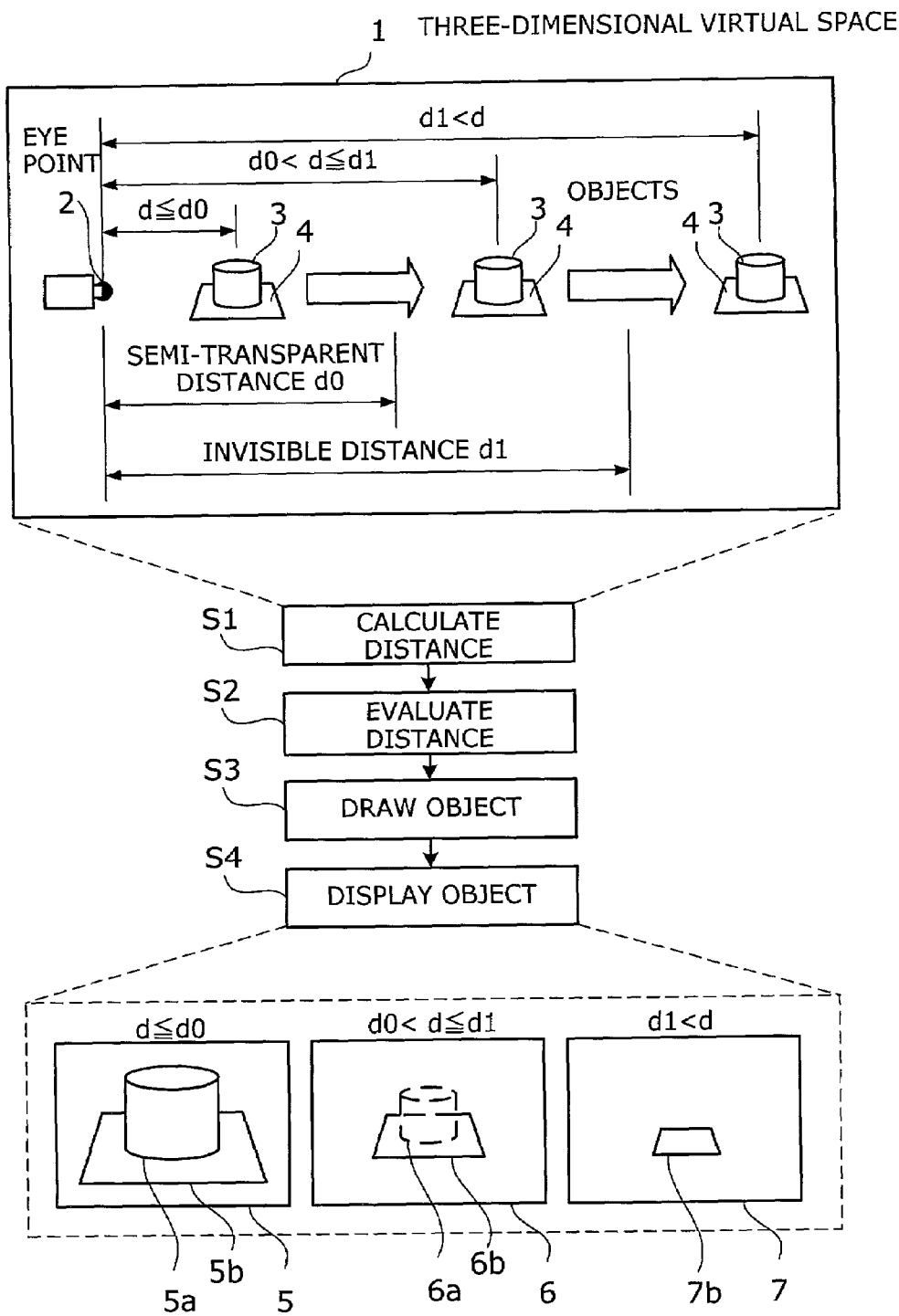
FIG. 1 is a conceptual view of the present invention.

FIG. 1 is a conceptual view of the present invention. The present invention provides a program for displaying graphical objects in a three-dimensional virtual space. The present invention also provides an object displaying apparatus which is realized by, for example, making a computer system execute the object displaying program.

The upper half of FIG. 1 shows two objects 3 and 4 moving away from an eye point 2 at which a hypothetical camera is placed. According to the program of the present invention, the distance d from the eye point 2 to the object 3 is first calculated (step S1). To evaluate this distance d, two critical distances are previously defined in association with the object 3. They are: semi-transparent distance d0 and invisible distance d1. The latter parameter should be greater than the former (d1>d0). Those two parameters d0 and d1 serve as the boundaries that divide the three-dimensional virtual space 1 into three domains in terms of the distance from the eye point 2.

The program now determines in which domain the object 3 is located (step S2) by comparing the distance d with the semi-transparent distance d0, as well as with the invisible distance d1. More specifically, this step S2 makes the following comparisons: (1) whether the distance d is greater than the semi-transparent distance d0 (i.e., d>d0); and (2) whether the distance d is greater than the invisible distance d1 (i.e., d>d1).

The object 3 is to be drawn only if the second criterion (2) is false (d<d1). If the first criterion (1) is false (d<d0), the object 3 is rendered as an opaque object. If the first criterion (1) is true (d>d0), the object 3 is rendered as a semi-transparent object (step S3). According to the result of the above test, the current image of the object 3 is drawn and displayed on the computer screen (step S4).

FIG. 1 shows another object 4 coexisting with the object 3 in the same three-dimensional virtual space 1. Unlike the first object 3, whose visibility is distance-dependent, this second object 4 is always visible. It is assumed, in the example of FIG. 1, that the first object 3 is put on the second object 4.

As mentioned above, the object 3 is moving away from the eye point 2. At first, it is located in the nearest domain (d<d0). It then enters the second domain beyond the semi-transparent distance d0 (d0<d≦d1), and it further goes into the third domain (d>d1) over the invisible distance d1. The bottom part of FIG. 1 shows three pictures 5 and 6, and 7 representing such distance-dependent images of the two objects 3 and 4.

When it resides in the first domain (d≦d0), the first object 3 is drawn in opaque mode, together with the second object 4, which is always visible. The left-most picture 5 is an example of the view in this situation, where the first and second objects 3 and 4 are represented in opaque images 5a and 5b, respectively.

The first object 3 is still visible in the second domain (d0<d≦d1), but it is rendered in semi-transparent mode. The middle picture 6 is an example of the view in this situation, where the first object 3 is has a semi-transparent image 6a while the second object 4 an opaque image 6b.

In the third domain (d>d1), the first object 3 is not to be drawn. The right-most picture 7 shows this situation, in which only the second object 4 is rendered as a smaller image 7b.

In the way described above, the first object 3 moving away from the eye point 2 finally vanishes out of sight. This means that far objects in a video scene are no longer subjected to the drawing or displaying tasks, so as to reduce the processing workloads. The present invention, however, smoothes down their transition from visible state to invisible state by introducing an intermediate step, i.e., semi-transparent state. Since the proposed program prevents distant objects from disappearing suddenly, the audience will accept the video scene without feeling any strangeness.

The present invention may be applied to a simulation system which enables a person to walk through a city street created in a computer system. This virtual city street is constructed as a collection of three-dimensional objects in a virtual embodiment. The user operates the simulation system to move his/her eye point, so that the realtime view of the virtual street will be displayed on a monitor screen.

Figure 2:
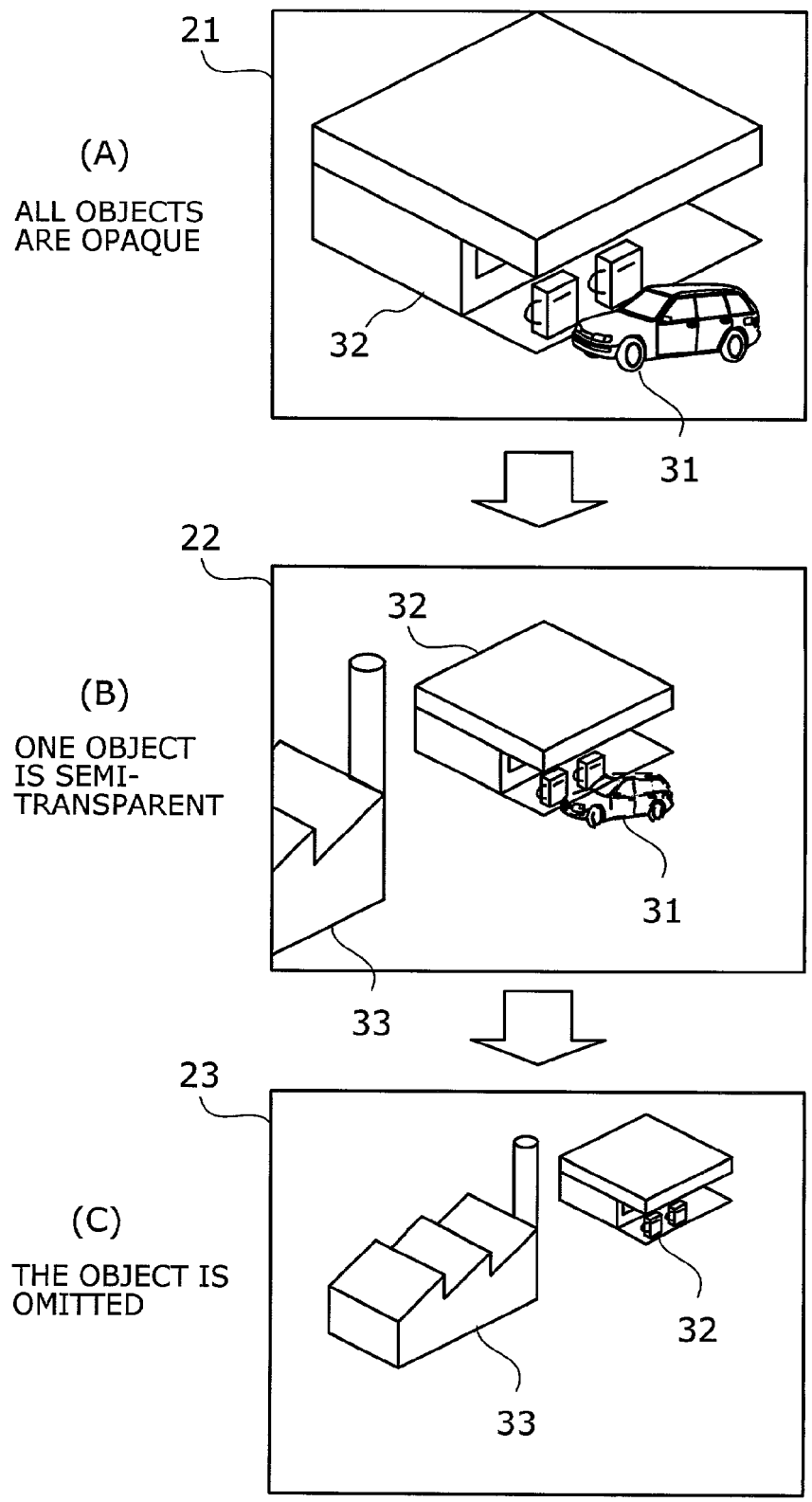
FIG. 2 shows three video scenes according to the present invention, which represent different states of object visibility when the distance from the eye point is varied, the states including: (A) all objects are opaque, (B) one object is semi-transparent, and (C) the object is omitted.

FIG. 2 shows three video scenes (A), (B), and (C) according to the present invention, which represent different states of object visibility when the distance from the eye point is varied. More specifically, the three scenes show the following situations: (A) all objects are opaque, (B) one object is semi-transparent, and (C) the object is omitted.

The first scene (A) involves two objects 31 and 32, the former representing an automobile and the latter a gas station. The automobile object 31 is characterized as a variable-visibility object, meaning that it is normally visible to the viewer, but not to be seen when away from the eye point. The gas station object 32, on the other hand, is defined as one of the main structures constituting the virtual street, and it is therefore appears on the screen regardless of whether it is distant or not, as long as it is in sight.

By moving the eye point backward (or moving it away from the objects), the object's view changes as shown in the second scene (B) of FIG. 2. This second view 22 includes three objects 31 to 33, the added object 33 representing a factory located nearer than the gas station object 32. Because of their increased distance from the eye point, the automobile object 31 and gas station object 32 look smaller in the second view 22 than in the first view 21. Note that the automobile object 31 is drawn in semi-transparent mode.

A further backward movement of the eye point yields another view of the objects as shown in the third scene (C) of FIG. 2. This third view 23 includes only two objects, the gas station object 32 and factory object 33. The automobile object 31 is not seen. While it was semi-transparent in the second view 22, the automobile object 31 is completely invisible in the third view 23 because of its increased distance from the eye point.

In the way described above, the automobile object 31 migrates to an invisible state via a semi-transparent state, as it moves away from the eye point. Note that this change in the visibility occurs in synchronization with the reduction in image size. That is, the image of the object 31 shrinks with the distance, and at some point, it starts fading out. The image gets even smaller and dimmer until it completely disappears at the end. In this way, the proposed method stops drawing the object 31 in the middle of a continuous series of pictures, without causing any unnatural visual effect.

Figure 3:
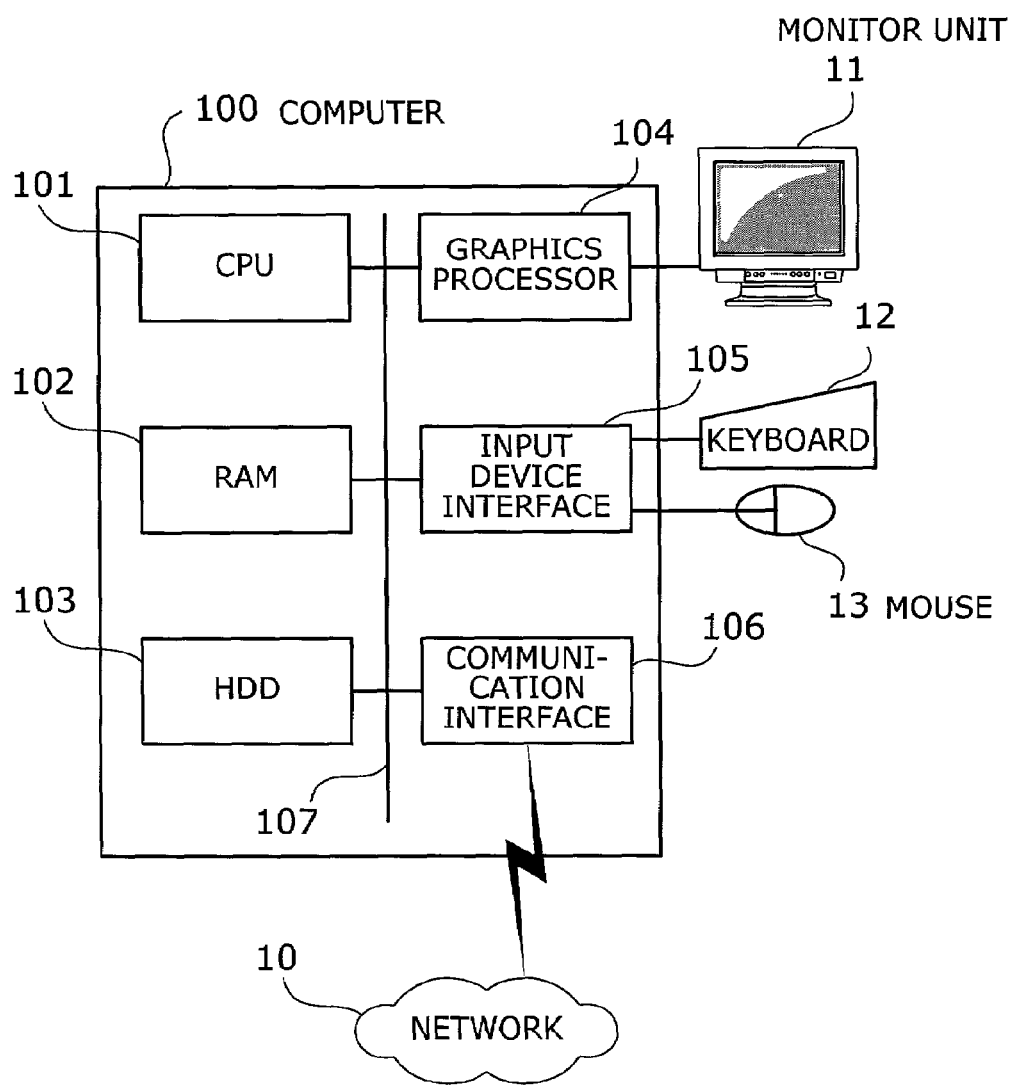
FIG. 3 shows an example of a computer platform on which the present invention is embodied.

The present invention is embodied as a computer system as will be described in detail below. FIG. 3 shows an example of a computer platform on which the present invention is embodied. The illustrated computer 100 comprises the following elements: a central processing unit (CPU) 101, a random access memory (RAM) 102, a hard disk drive (HDD) unit 103, a graphics processor 104, an input device interface 105, and a communication interface 106. The CPU 101 controls the computer 100 in its entirety, interacting with other elements via a common bus 107.

The RAM 102 temporarily stores at least a part of operating system (OS) and application programs that the CPU 101 executes, in addition to other various data objects manipulated at runtime. The HDD unit 103 stores program and data files of the operating system and various applications. The graphics processor 104 produces video images in accordance with drawing commands given from the CPU 101 and displays them on the screen of an external monitor unit 11 coupled thereto. The input device interface 105 is used to receive signals from external input devices such as a keyboard 12 and a mouse 13. Those input signals are supplied to the CPU 101 via the bus 107. The communication interface 106 is connected to a wide area network 10, such as the Internet, allowing the CPU 101 to exchange data with other computers.

Figure 4:
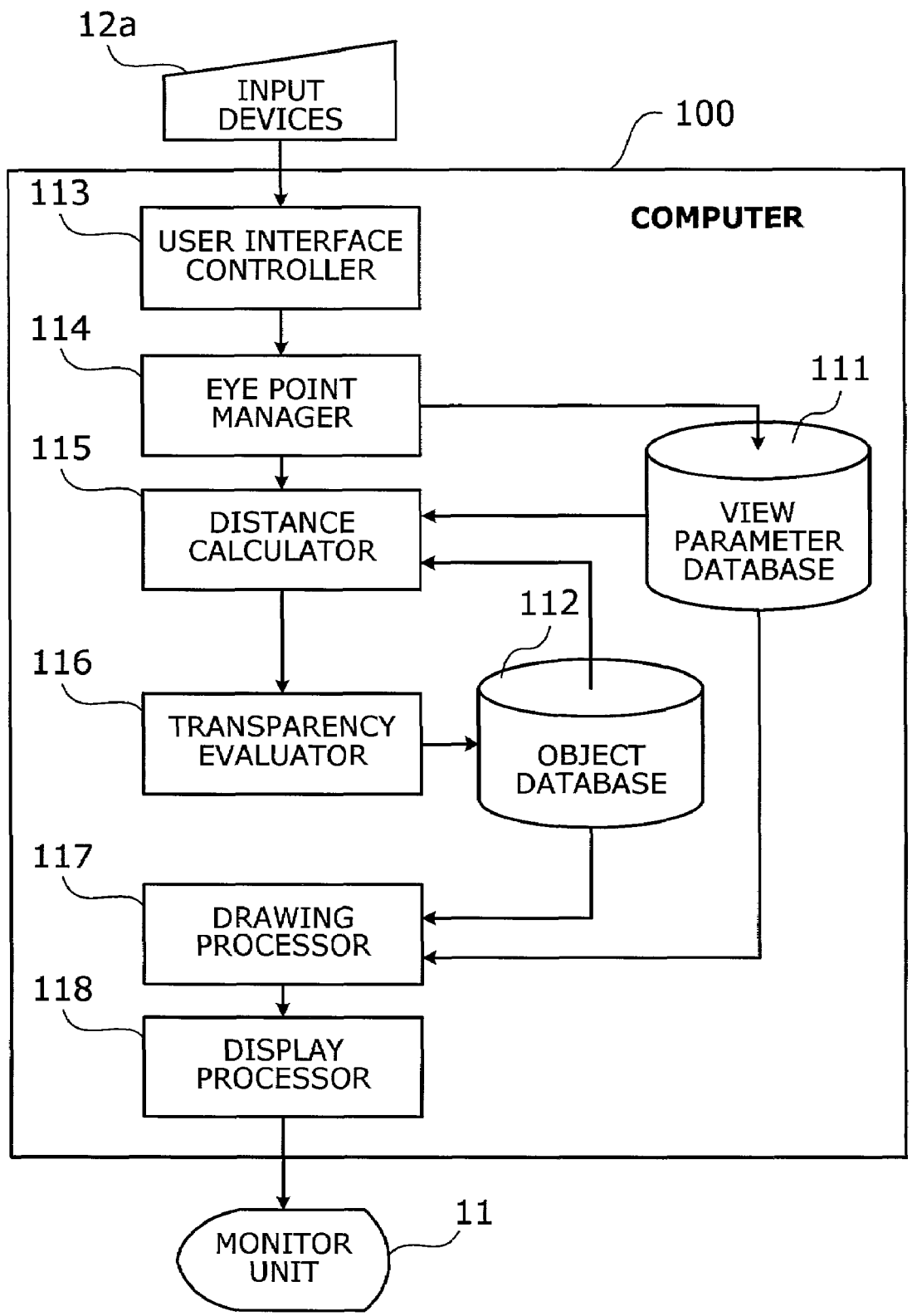
FIG. 4 is a block diagram showing a functional structure of the present invention.

The proposed object displaying program is executed on the above-described hardware platform of the computer 100, so as to provide the intended processing steps. The computer 100 now functions as an object displaying apparatus according to the present invention. FIG. 4 is a block diagram showing a functional structure of the present invention. The computer 100 creates object images according to the commands entered through input devices 12a (e.g., keyboard 12 and mouse 13 shown in FIG. 3) and outputs them to the monitor unit 11. In the computer 100 of FIG. 4, the following functional blocks are implemented: a view parameter database 111, an object database 112, a user interface controller 113, an eye point manager 114, a distance calculator 115, a transparency evaluator 116, a drawing processor 117, and a display processor 118.

The view parameter database 111 stores parameters about the eye point and projection plane, which are referred to herein as "view parameters." Such view parameters are updated each time the user gives a relevant operation command. The object database 112 stores object definitions including the geometry and color of each object, which are collectively referred to herein as "object data."

The user interface controller 113 produces a control command to manipulate the eye point (i.e., the user's viewpoint in a three-dimensional virtual space) according to signals supplied from the input devices 12a. The produced control command is passed to the eye point manager 114. The eye point manager 114 determines eye point parameters (i.e., eye point coordinates and line-of-sight vector) in response to the control command sent from the user interface controller 113. The eye point manager 114 stores those eye point parameters in the view parameter database 111, and informs the distance calculator 115 of the updated eye point coordinates.

Upon receipt of the new eye point coordinates, the distance calculator 115 calculates the relative distance of each object with respect to the current eye point, consulting the records stored in the object database 112. The calculated distances are passed to the transparency evaluator 116. Based on this distance information, the transparency evaluator 116 determines the transparency of each object, consulting a relevant record in the object database 112. The transparency evaluator 116 updates that record in the object database 112 with the determined transparency factor.

The drawing processor 117 performs perspective projection of a given three-dimensional model, drawing each object's image on the projection plane according to the parameters read out of the view parameter database 111 and the object database 112. The projection is repetitively executed at a predetermined frame rate (e.g., 60 frames per second), resulting in a series of perspective views, or a continuous motion video. The display processor 118 sends each produced perspective view to the monitor unit 11, converting it into video signals.

Figure 5:
FIG. 5 shows a typical structure of a view parameter database.

FIG. 5 shows a typical structure of the view parameter database 111. The view parameter database 111 stores the following information: eye point coordinates E, line-of-sight vector V, up vector U, projection plane's distance D, projection plane's normal vector Sn, and the window size.

Eye point coordinates E indicate the current position of the eye point in the form of XYZ coordinates (Ex, Ey, Ez) in a given three-dimensional virtual space. The coordinate values are updated according to a relevant operation command from the user. Line-of-sight vector V is a unit vector representing which direction the hypothetical camera is pointing at. The three-dimensional components (Vx, Vy, Vz) of this vector are changed according to a relevant operation command from the user. Up vector U is a unit vector indicating a predetermined upward direction (Ux, Uy, Uz) of the view. In the present embodiment, the up vector U is supposed to be in parallel with the Z axis (i.e., the vertical axis) of the three-dimensional virtual space. Accordingly, the X- and Y-axis components of the up vector U are always zero (Ux=Uy=0).

Parameter D is defined previously as the distance from the eye point E to a predetermined reference point (e.g., the center) of the projection plane. Normal vector Sn of the projection plane indicates the direction perpendicular to the projection plane (Sx, Sy, Sz), which is calculated on the basis of the line-of-sight vector V and other related parameters. The window size parameters (Wx, Wy) give the size of the projection plane, which is previously defined.

Figure 6:
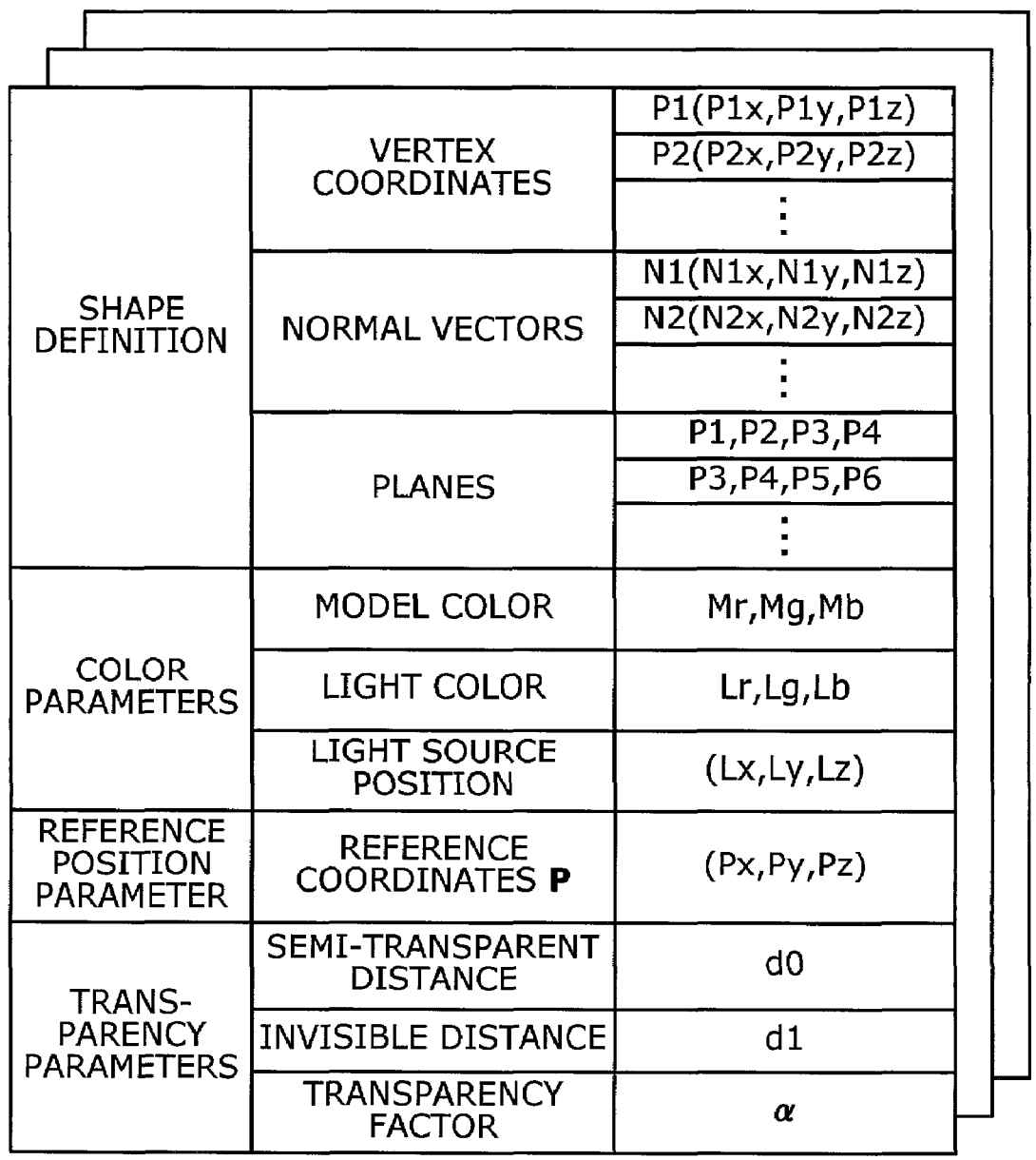
FIG. 6 shows a typical structure of records stored in an object database.

FIG. 6 shows a typical structure of records in the object database 112. The object database 112 stores records that describe the individual objects. Each object record consists of various parameters to define the following information on an object: shape definition, color parameters, reference position parameter, and transparency parameters.

The shape definition section of a database record contains the following parameters to define the shape of an object: (a) vertex coordinates, (b) normal vectors, and (c) planes. More specifically, the vertex coordinates refer to the coordinates (Pix, Piy, Piz) of each vertex Pi of the object in the three-dimensional virtual space, where Pi is the identifier of the i-th vertex (i=1 and 2, . . .). As FIG. 6 shows, the object database 112 stores coordinate values together with their associated vertex identifiers P1, P2, and so on. The normal vectors (Nix, Niy, Niz) indicate the normal direction of each vertex Pi. The object database 112 stores each normal vector together with its identifier Ni (i=1, 2, . . .) which are associated with the vertexes Pi.

Each plane of an object is defined as a set of vertexes. The object database 112 stores a plurality of planes, each of which is identified by a particular combination of vertex identifiers. For example, a rectangular plane is defined by four vertexes; a triangular plane is defined by three vertexes.

The color parameters section contains the following information: model color, light color, and light source position. The model color refers to the color of an object, which is expressed in the brightness (Mr, Mg, Mb) of three primary colors (red, green, blue). While the example of FIG. 6 shows only one model color, it is possible to specify the color of each individual plane. The light color refers to the color of lights emanating from a given light source, which is represented as the brightness (Lr, Lg, Lb) of three primary colors (red, green, blue). The light source position (Lx, Ly, Lz) refers to the coordinates of the light source in the three-dimensional virtual space. The reference position parameter (Px, Py, Pz) shows the coordinates of the object's reference point P.

The transparency parameters section contains the following items: semi-transparent distance, invisible distance, and transparency factor. The semi-transparent distance d0 (d0>0) means the distance from the eye point to the first domain boundary, beyond which the object of interest is displayed in semi-transparent mode. Within this boundary, the object is displayed in opaque mode. The invisible distance d1 (d1>0) is the distance from the eye point to the second domain boundary, beyond which the object of interest is not displayed. The invisible distance has to be longer than the semi-transparent distance (d0<d1). The transparency factor $\alpha$ is a variable that represents the current transparency of the object of interest. This parameter $\alpha$ lies in the range of zero to one ($0 \leq \alpha \leq 1$), where $\alpha=0$ means that the object is perfectly opaque, and $\alpha=1$ means that it is completely transparent (i.e., invisible).

The transparency factor $\alpha$ is updated as required, depending on the distance between the eye point and object. In the case the maximum allowable value is set to the semi-transparent distance and invisible distance of a certain object, a fixed transparency value (e.g., zero) is given to that object, regardless of its distance d from the eye point. Some implementations may restrict the update of transparency parameters. In that case, a control flag is assigned to each object, so that the transparency factor of that object can be updated according to the distance d from the eye point, only when the flag is set.

In generating a picture, the computer writes perspective-projected object images one after another into a frame buffer. That is, one object is written over the existing image of other objects that have been drawn in the frame buffer, and in this processing, the current transparency factor a of the object has to be taken into consideration. More specifically, the computer multiplies the intensity (i.e., RGB values) of the object image by a factor of $(1-\alpha)$, while multiplying that of the existing image by the transparency factor a itself. Then it adds the two multiplication results, thereby blending the given object image into the existing image according to its current transparency factor of $\alpha$.

According to the present embodiment, the transparency factor $\alpha$ of an object is calculated with the following formulas, based on the distance d from the eye point to the object.

$$\alpha = \begin{cases} 0 & (d \leq d0) \quad (1) \\ (d-d0)/(d1-d0) & (d0 < d \leq d1) \quad (2) \\ 1 & (d > d1) \quad (3) \end{cases}$$

The distance d is expressed as $$d=|E-P| \quad (4)$$

where E is the coordinates of the eye point, and P is those of the reference point of the object.

Figure 7:
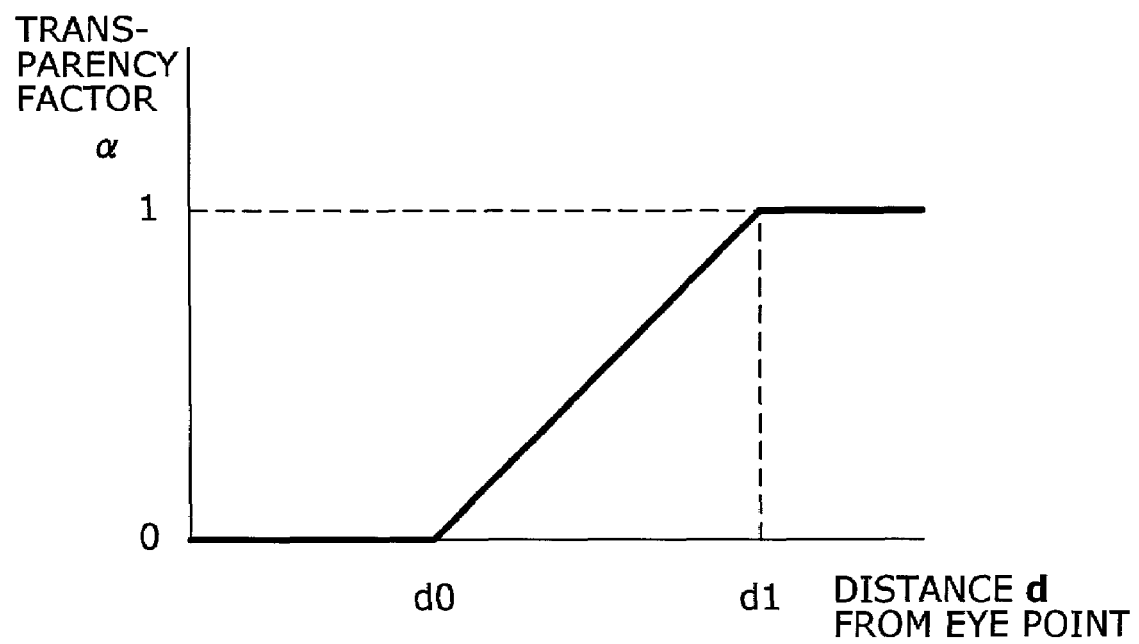
FIG. 7 shows how the transparency of an object varies with its distance from the eye point.

FIG. 7 shows how the transparency of an object is varied with its distance d from the eye point, where the horizontal axis shows the distance d, and the vertical axis represents the transparency factor $\alpha$. As seen from this graph, $\alpha$ stays at zero until the distance d reaches the semi-transparent distance d0, meaning that the object is displayed in opaque mode.

When the distance d exceeds the semi-transparent distance d0, the object has a non-zero transparency ($\alpha>0$), and it is thus drawn and displayed in semi-transparent mode. The transparency factor a increases continuously until it reaches the value of one at the invisible distance d1; the object becomes more and more transparent as it moves away from the eye point.

For the distances d greater than the invisible distance d1, the transparency factor α is saturated at one. The object therefore looks transparent in this domain, which means that the object does not appear on the monitor screen, and that the computer need not spend its processing resource to that object in perspective projection and other image drawing tasks.

In the way described above, the conditions for perspective projection in a particular scene is determined by the parameters explained in FIGS. 5 and 6. That is, the computer 100 performs three-dimensional perspective projection according to the information in the view parameter database 111 and object database 112.

Figure 8:
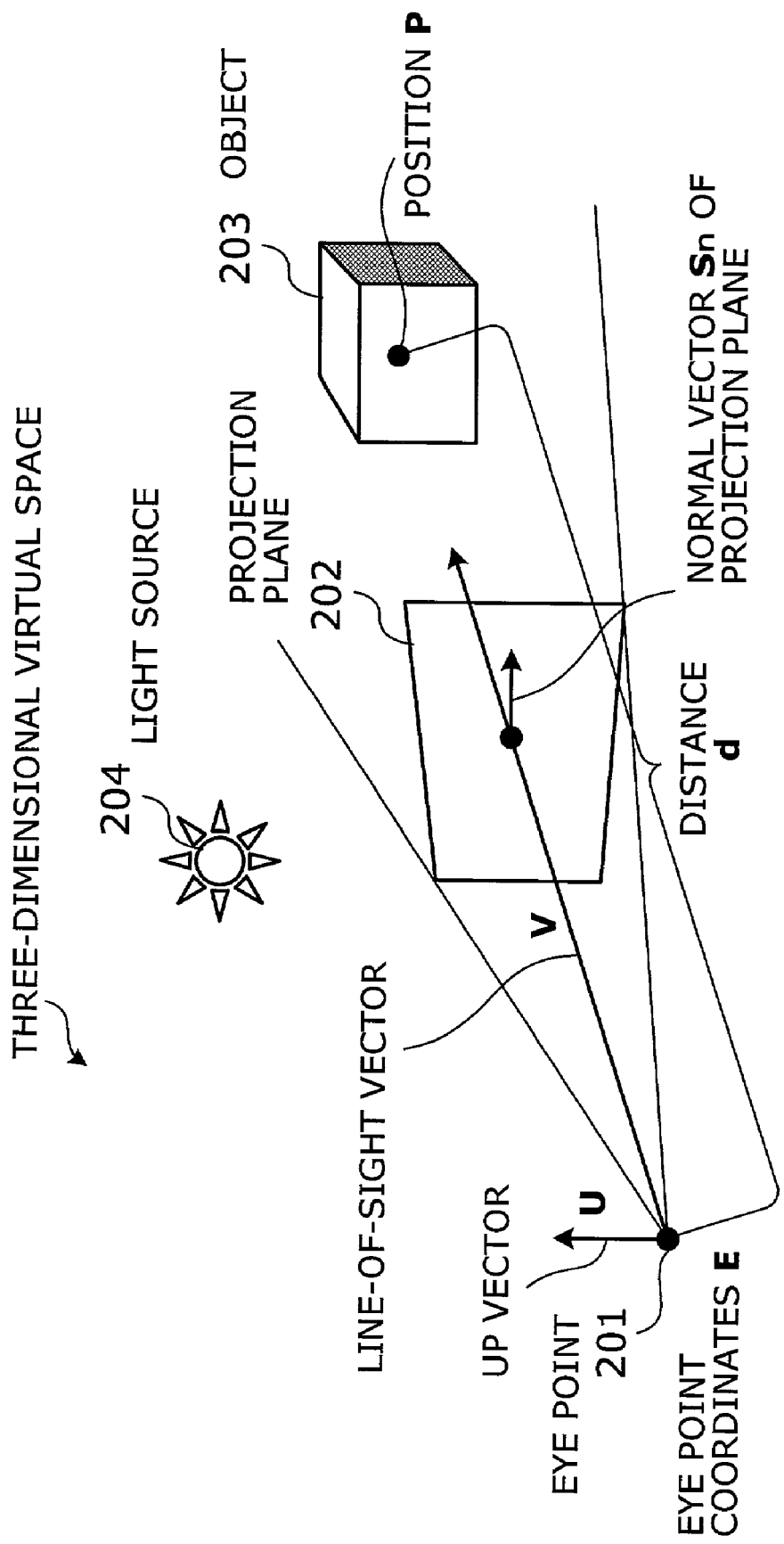
FIG. 8 schematically shows the concept of a three-dimensional perspective projection.

FIG. 8 schematically shows the concept of three-dimensional perspective projection. Arranged in the illustrated three-dimensional virtual space are: an eye point 201, a projection plane 202, an object 203, and a light source 204. The definition of the eye point 201 includes eye point coordinates E and a line-of-sight vector V. The projection plane 202 is characterized by its normal vector Sn and other parameters. The object 203 has its reference coordinates P. which are used together with the eye point coordinates E to calculate the distance d between the object 203 and eye point 201. The light source 204 is characterized by such parameters as a light source position and light color.

Figure 9:
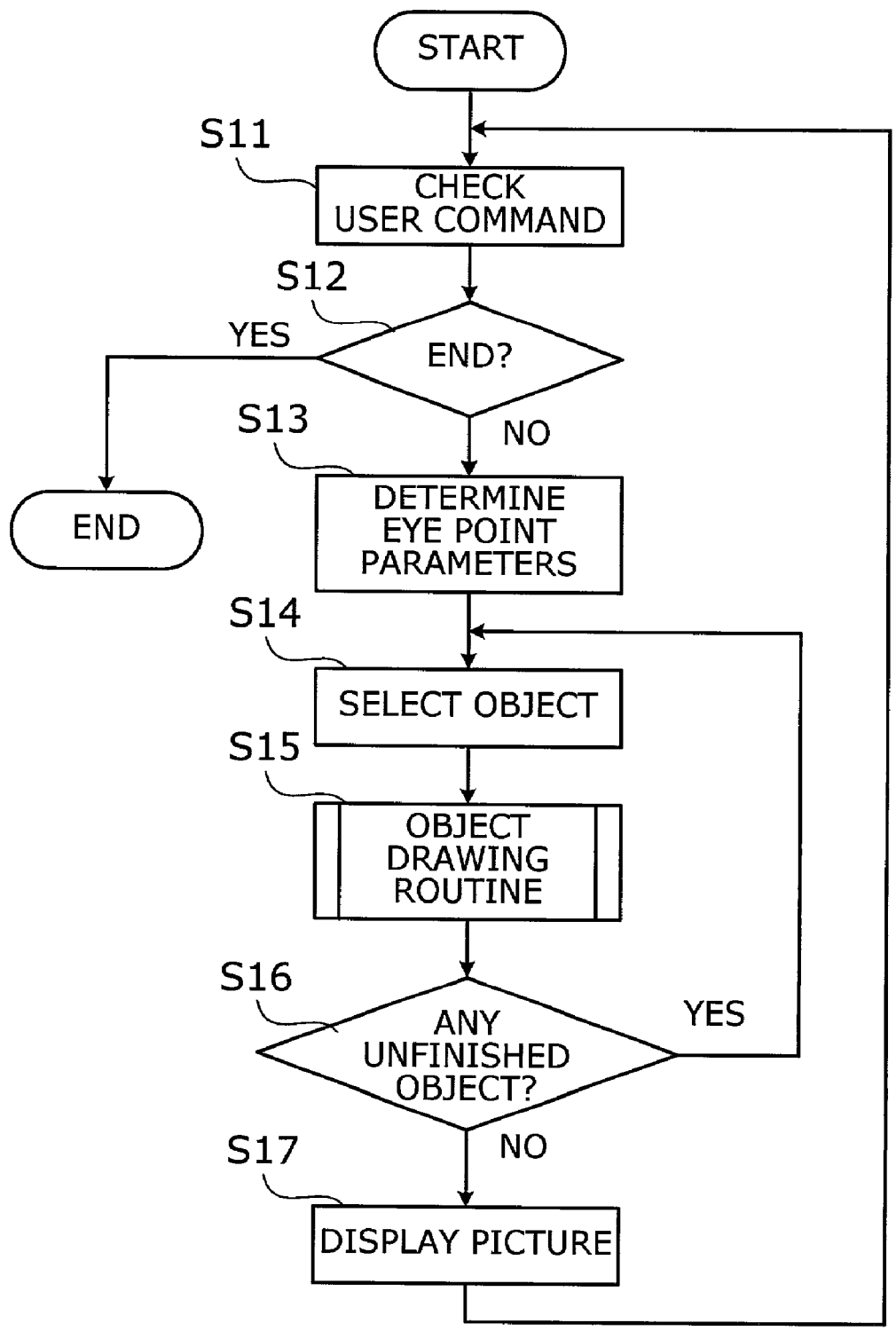
FIG. 9 is a flowchart of an object drawing and displaying process.

Referring next to the flowchart of FIG. 9, the computer-implemented processing in the present embodiment will be explained below. FIG. 9 shows the main flow of an object drawing and displaying process, which comprises the following steps:

(S11) The user operates the input devices 12a to give a command to the system. The user interface controller 113 accepts this command and supplies the eye point manager 114 with updated control parameters according to the given user command, if it requires a movement of the eye point 201 and/or line-of-sight vector V.

(S12) The user interface controller 113 determines whether the user command is intended for termination of the current process. If so, the process is concluded. If not, the process advances to step S13.

(S13) The eye point manager 114 determines eye point parameters in accordance with the given control parameters. What are called the "eye point parameters" are the coordinates E and line-of-sight vector V of the eye point 201. The eye point manager 114 registers the determined eye point parameters in the view parameter database 111, as well as passing the eye point coordinates E to the distance calculator 115.

(S14) The distance calculator 115 selects one unfinished object 203 from among those registered in the object database 112.

(S15) The selected object 203 is subjected to an object drawing routine, which is performed by the distance calculator 115, transparency evaluator 116 and drawing processor 117. The details of this object drawing routine will be discussed later with reference to another flowchart.

(S16) The distance calculator 115 determines whether there is any unfinished object. If an unfinished object is found, the process returns to step S14. If all objects have been finished, the process proceeds to step S17.

(S17) Now that the drawing processor 117 has created a new picture, the display processor 118 displays it on the screen of the monitor unit 11. After that, the process returns to step S11 to produce the next frame picture.

Figure 10:
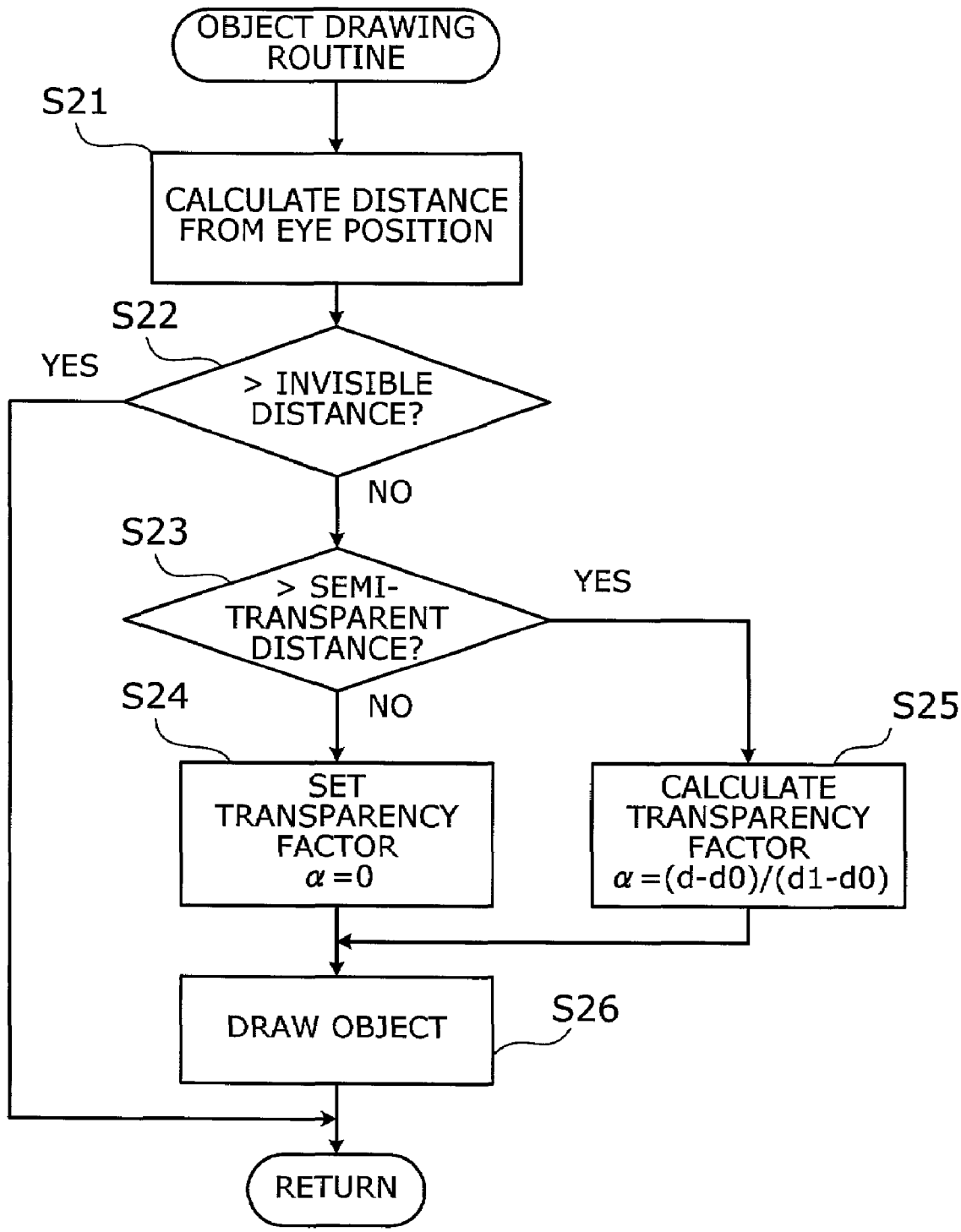
FIG. 10 is a flowchart which shows the details of an object drawing routine.

FIG. 10 is a flowchart which shows the details of the object drawing routine called at step S15 of FIG. 9. This object drawing routine comprises the following steps:

(S21) Given the eye point coordinates E and the object's reference coordinates P from the eye point manager 114, the distance calculator 115 calculates the distance d between the eye point and object of interest. The calculated distance d is then passed to the transparency evaluator 116.

(S22) The transparency evaluator 116 compares the calculated distance d with the invisible distance d1. If the distance d is longer than the invisible distance d1, the current routine is terminated, and the control is returned to the calling process, permitting the main process to resume from step S16 of FIG. 9. If the distance d is not longer than the invisible distance d1, the process is advanced to step S23. In this way, the step S22 skips the task of drawing an object if its distance is longer than the invisible distance d1. This is because the object's transparency factor α is one, meaning that the object cannot be seen on the screen. Skipping the drawing task saves the computing resources, contributing to efficient processing.

(S23) The transparency evaluator 116 compares the distance d with the semi-transparent distance d0. If the distance d is longer than the semi-transparent distance d0, the process is advanced to step S25. If it not longer than the semi-transparent distance d0, the process is advanced to step S24.

(S24) The transparency evaluator 116 sets a value of zero to the transparency factor α and saves it into the object database 112. The process is then advanced to step S26.

(S25) The transparency evaluator 116 calculates a transparency factor α with the equation (2) and enters the resultant value of α to the object database 112. The process then proceeds to step S26.

(S26) The drawing processor 117 performs perspective transformation and other tasks to draw the three-dimensional object of interest, based on the parameters stored in the view parameter database 111 and object database 112. The resultant object image is drawn in a certain memory area (e.g., a frame buffer in the graphics processor 104) that is associated with the projection plane 202.

Through the above processing steps, the computer 100 draws each given object, considering its associated transparency factor α which is defined as a function of the distance d from the eye point 201.

Referring now to FIG. 11 to FIG. 17, the next section presents a series of pictures created according to the present embodiment.

Figure 11:
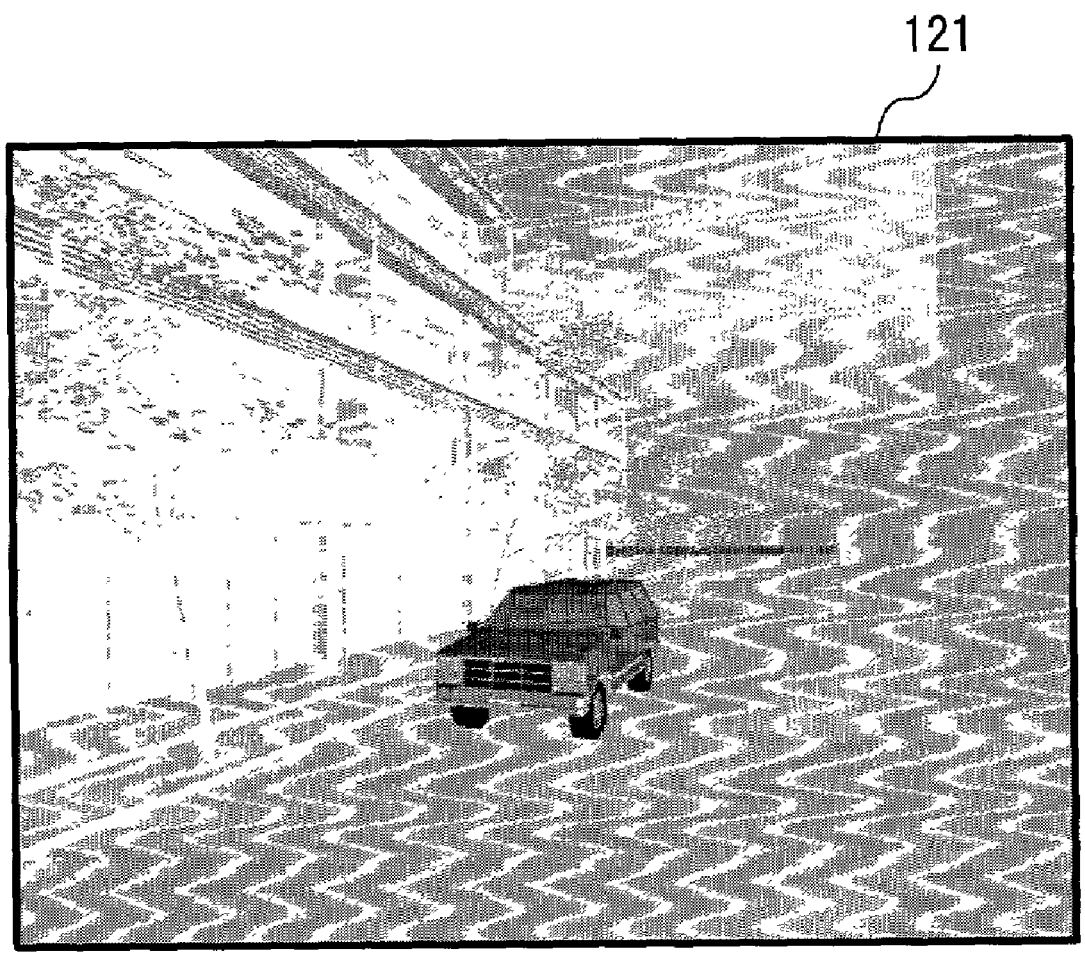
FIG. 11 shows a first example screenshot in the present embodiment.

FIG. 11 shows a first example screenshot in the present embodiment. This picture 121 shows an automobile parked on a road in a virtual city environment. The automobile object is displayed in opaque mode in this first example, because its distance d from the eye point 201 is shorter than the semi-transparent distance d0.

Figure 12:
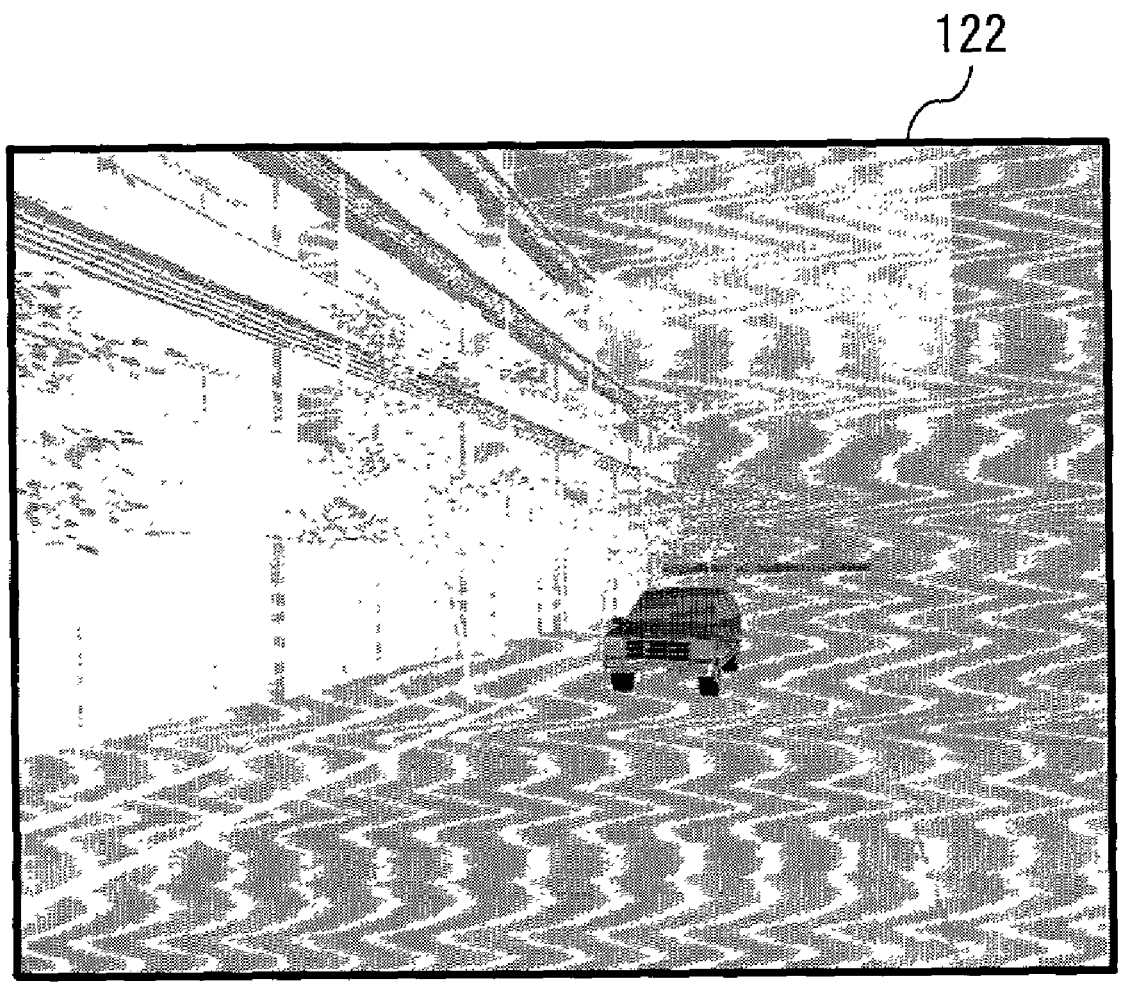
FIG. 12 shows a second example screenshot in the present embodiment.

FIG. 12 shows a second example screenshot in the present embodiment. While it is similar to the previous picture 121 of FIG. 11, this picture 122 shows a scene in which the eye point 201 has been moved away from the automobile object. Because of the increased distance, the automobile object in the new picture 122 looks smaller than that in the previous picture 121. The distance d, however, is still shorter than the semi-transparent distance d0, and accordingly, the viewer can see the automobile as an opaque object.

Figure 13:
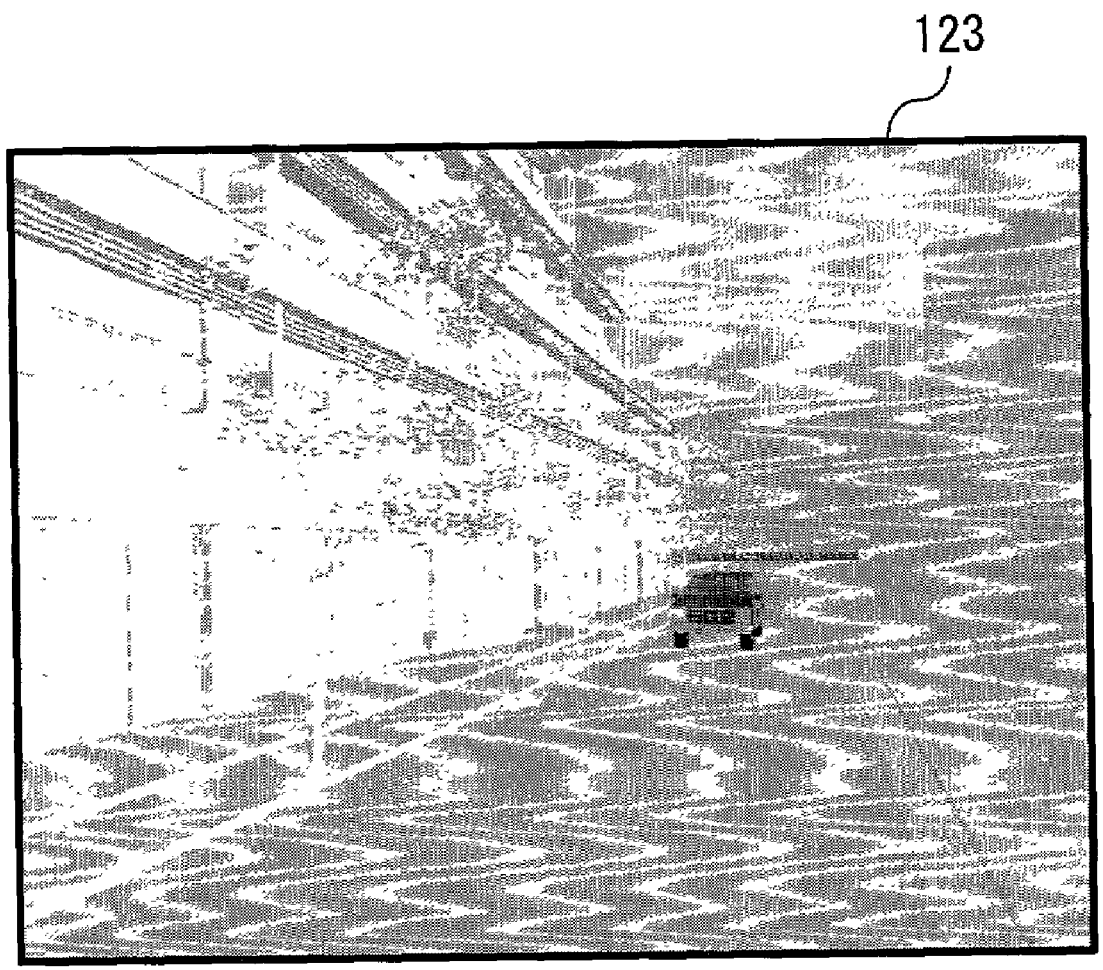
FIG. 13 shows a third example screenshot in the present embodiment.

FIG. 13 shows a third example screenshot in the present embodiment. Compared to the previous picture 122 of FIG. 12, this picture 123 shows a scene in which the eye point 201 has been moved a bit further. Because of the increased distance, the automobile object in the current picture 123 looks smaller and dimmer than that in the previous picture 122. That is, the distance d has exceeded the semi-transparent distance d0.

Figure 14:
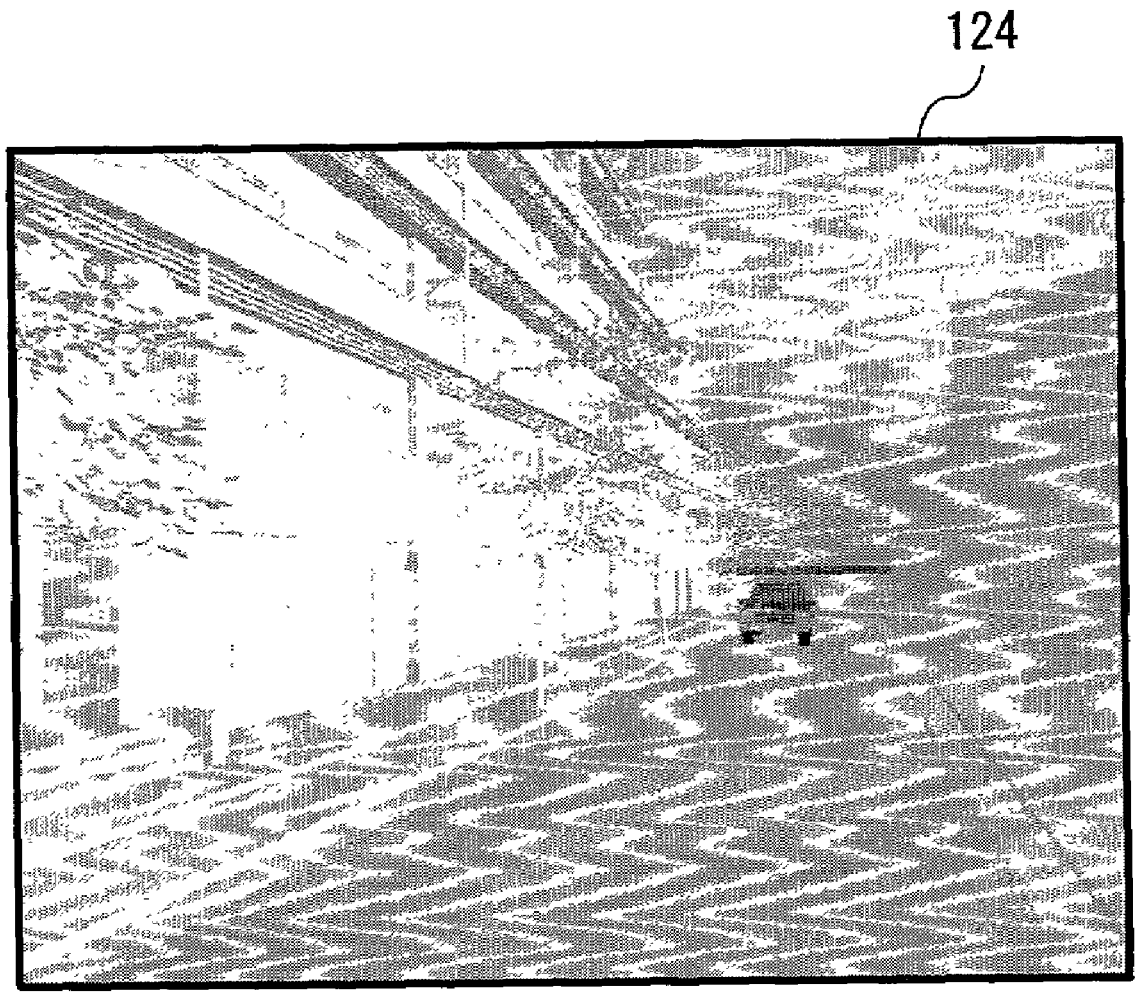
FIG. 14 shows a fourth example screenshot in the present embodiment.

FIG. 14 shows a fourth example screenshot in the present embodiment. Compared to the previous picture 123 of FIG. 13, the new picture 124 shows a scene in which the eye point 201 has been moved further. With the increased distance, the automobile object in the current picture 124 looks still smaller and dimmer than that in the previous picture 123.

Figure 15:
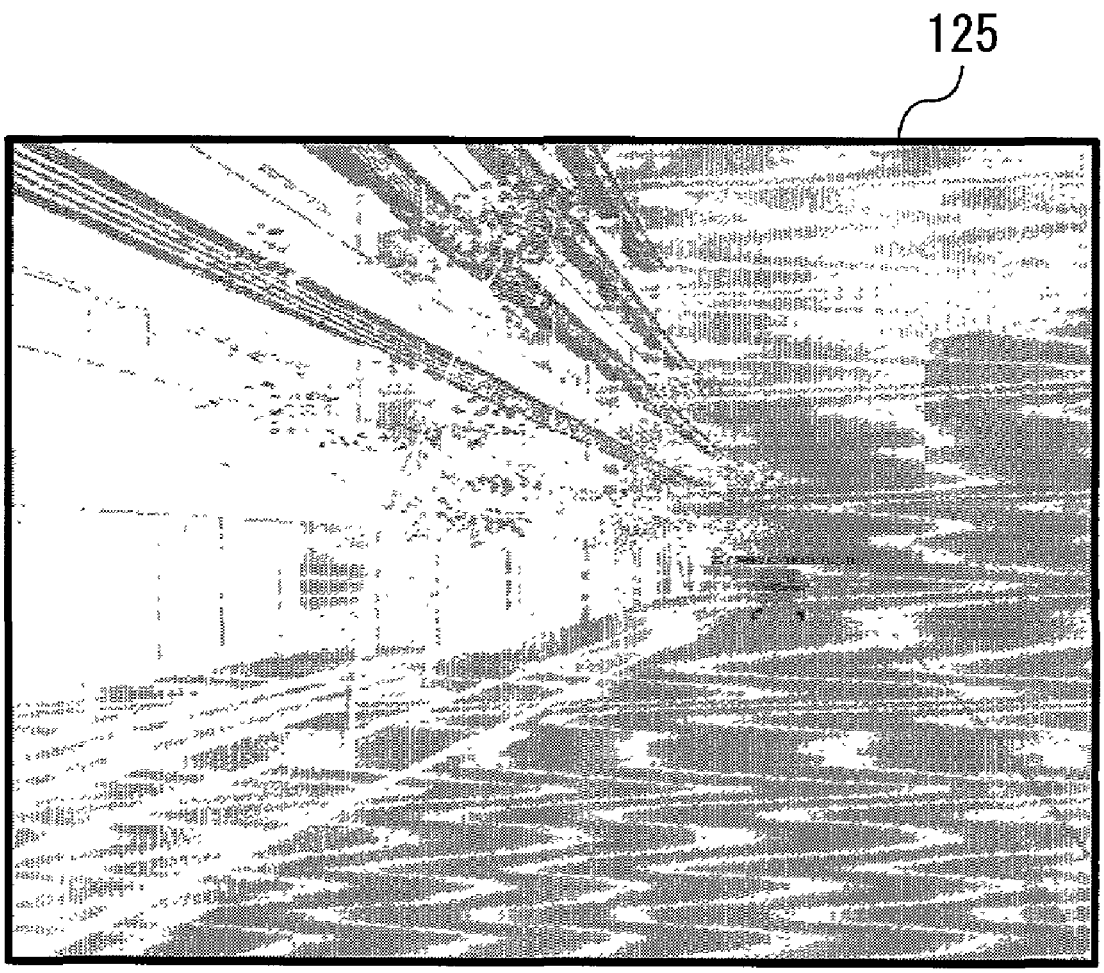
FIG. 15 shows a fifth example screenshot in the present embodiment.

FIG. 15 shows a fifth example screenshot in the present embodiment. Compared to the previous picture 124 of FIG. 14, the new picture 125 shows a scene in which the eye point 201 has been moved still further. With the increased distance, the automobile object in the current picture 125 looks much smaller and dimmer than ever.

Figure 16:
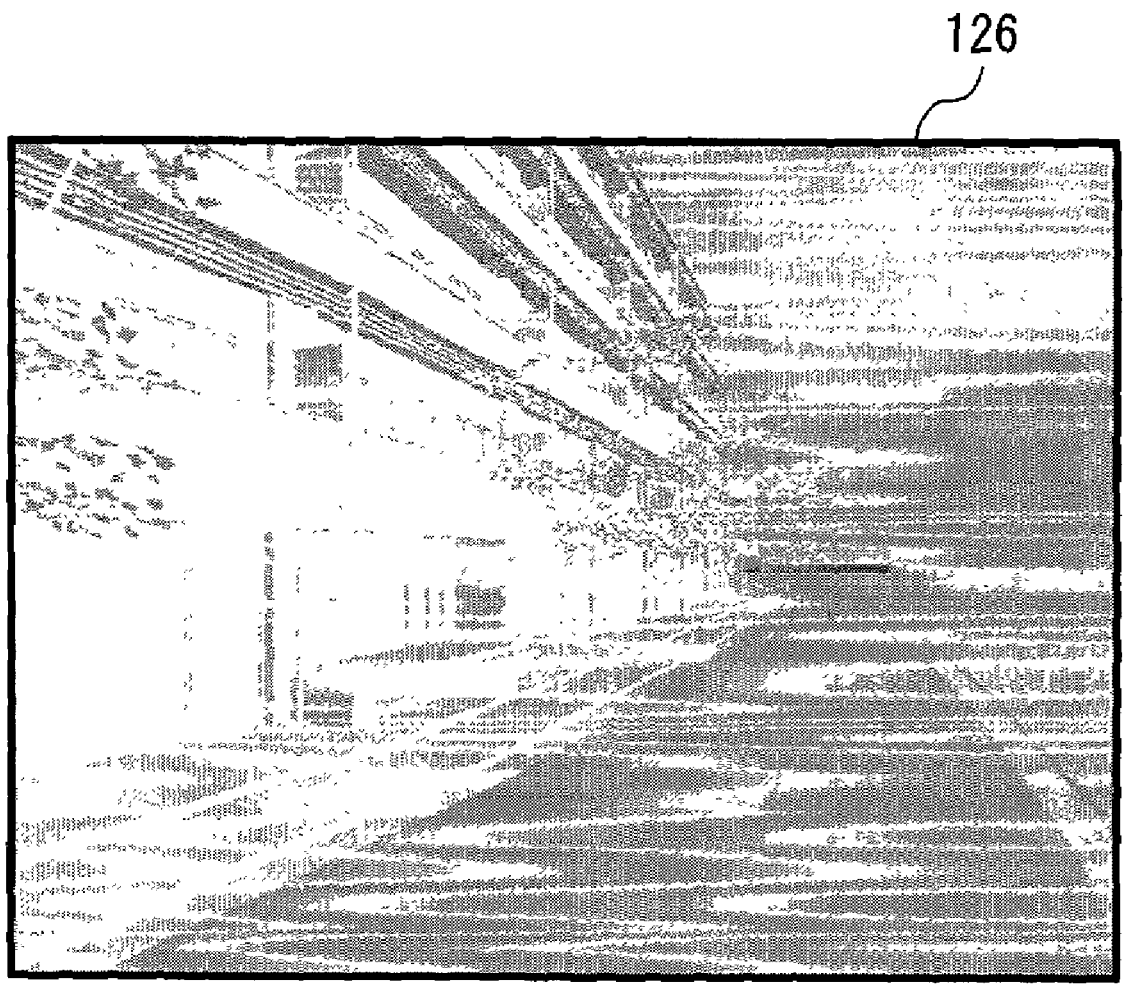
FIG. 16 shows a sixth example screenshot in the present embodiment.

FIG. 16 shows a sixth example screenshot in the present embodiment. Compared to the previous picture 125 of FIG. 15, this new picture 125 shows a scene in which the eye point 201 is moved still further. The automobile object is now fading away in the distance, the image being blended almost completely into the background texture. This is because of its long distance from the eye point 201, which makes the perspective-projected image too small and obscure to see.

Figure 17:
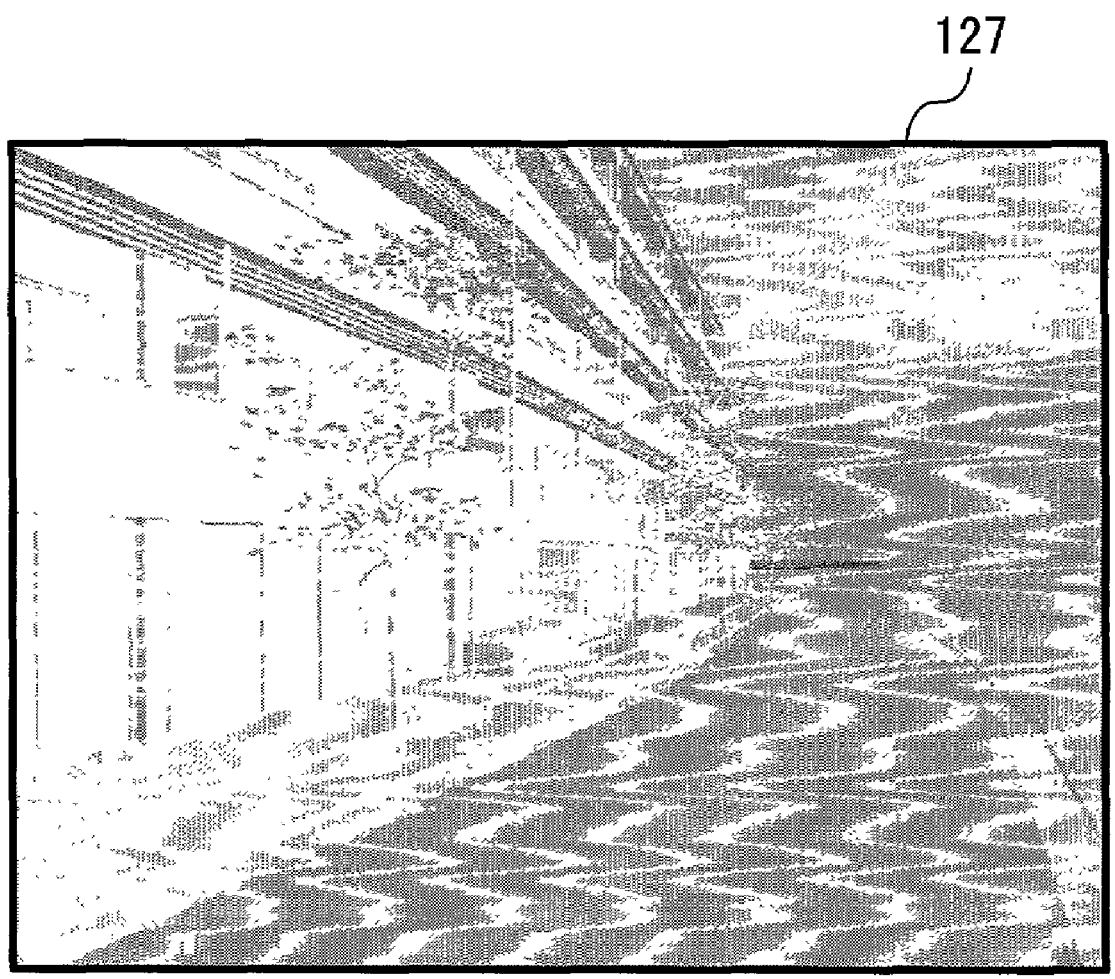
FIG. 17 shows a seventh example screenshot in the present embodiment.

FIG. 17 shows a seventh example screenshot in the present embodiment. Compared to the previous picture 126 of FIG. 16, this new picture 127 shows a scene in which the eye point 201 is moved still further. Now that the distance d has exceed the invisible distance d1, the automobile is not seen in the picture 127.

In summary, the above-described embodiment of the invention creates semi-transparent images of a graphical object of interest with a transparency factor being varied according to its distance d from the eye point 201, so that the created images will serve as a migration path for the object to reach an invisible state. As a result, the transparency of that object increases with the distance from the eye point 201, and it will have been a small and dim image when it finally disappears from the screen. Unlike the conventional object displaying methods, the proposed system enables viewers to see a smooth and continuous transition of moving objects, preventing a remote object from suddenly dropping out of their sight.

The person skilled in the art would appreciate that the above-described mechanism will also affect the appearance of objects approaching to the eye point 201 from far distant places. Such an approaching object comes into view, gradually increasing its opaqueness (i.e., it becomes opaque via semi-transparent states). Here, the proposed control mechanism prevents the object from appearing suddenly on the monitor screen.

The present embodiment further allows each individual object to have a different set of semi-transparent and invisible distance parameters. It is therefore possible to assign, for example, smaller parameter values to smaller objects. Because small objects occupy less space than large objects on a monitor screen, the audience would find it natural even if the system drew a small object in semi-transparent mode or removed it from the view at an earlier stage.

In addition, the present embodiment allows designers to control each object in terms of whether to give a variable transparency or a fixed transparency, depending on how important role the object plays in their intended computer graphics model. Suppose, for example, that an architect is attempting to construct a virtual city environment for an urban redevelopment project that he/she is going to propose. While buildings and other structures are major objects constituting a virtual city street, automobiles parked on the roadside are of less importance since they are movable. According to this difference, the architect sets up a model in such a way that the buildings and other major structures are represented always in opaque mode, regardless of their distances from the eye point 201, while automobiles may appear semi-transparent depending on the distance. With this setup, the system will never remove important objects from the view.

Figure 18:
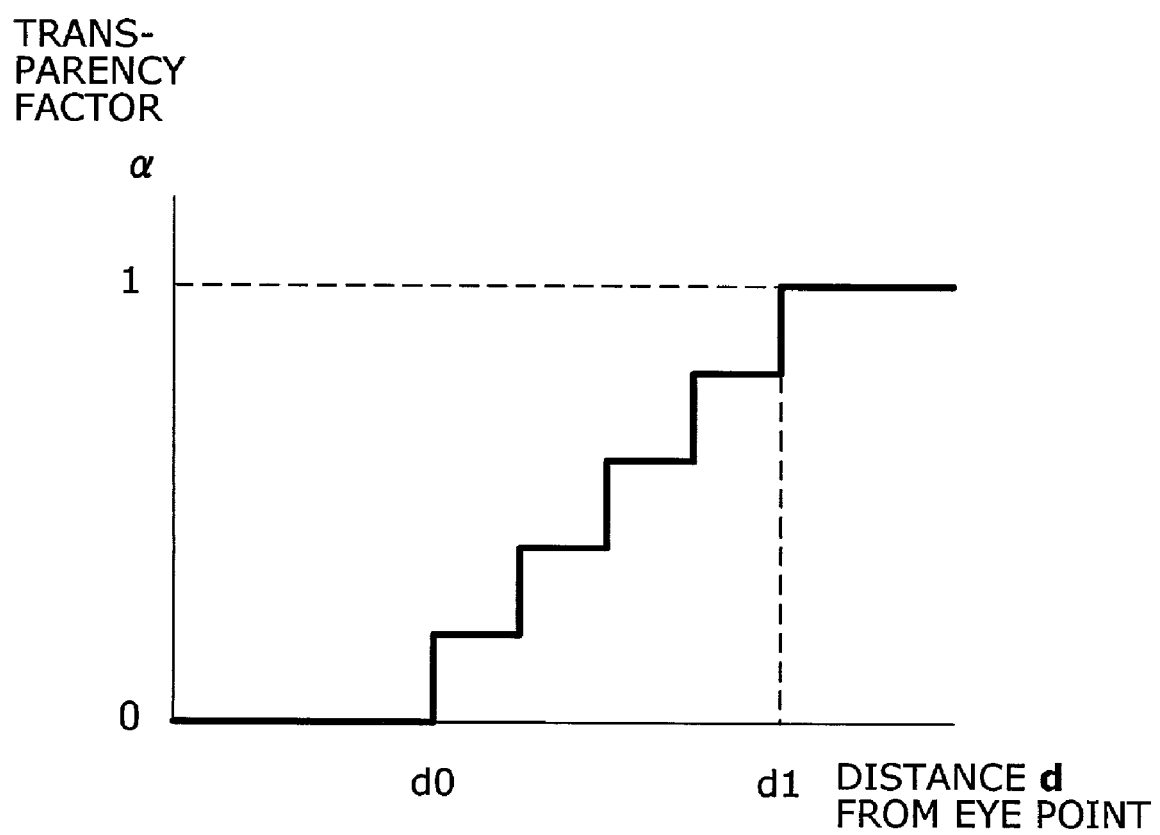
FIG. 18 shows how the transparency of an object varies in accordance with its distance from the eye point.
Figure 19:
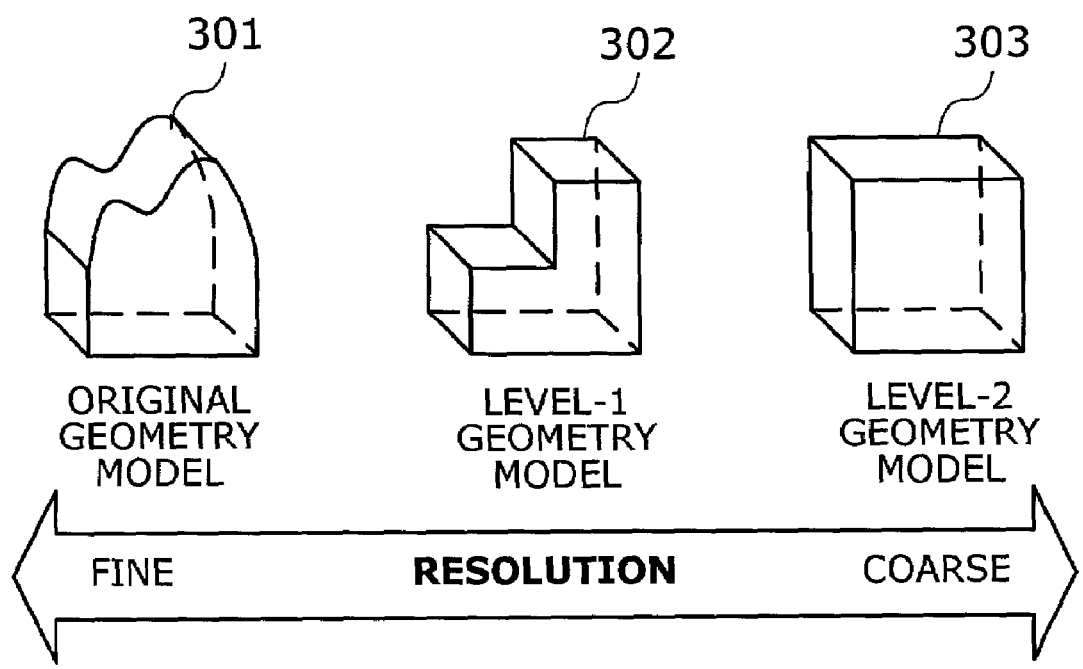
FIG. 19 shows an example of a conventional graphic representation technique which varies the resolution of an object in a stepwise manner.

The present invention has been discussed with the assumption that the transparency factor $\alpha$ varies continuously when the distance d exceeds the semi-transparent distance d0. The present invention, however, should not be limited to this configuration. It is also possible, for example, to increase the transparency factor a stepwise. FIG. 18 shows how the transparency of an object varies in this alternative configuration, where the horizontal axis shows the distance d from the eye point 201, and the vertical axis represents the transparency factor $\alpha$.

In the example of FIG. 18, the transparency factor $\alpha$ stays at zero when the distance d is smaller than the semi-transparent distance d0. When the distance d exceeds the semi-transparent distance d0, the transparency factor $\alpha$ is raised by a 20-percent increment, until it reaches the maximum value, $\alpha=1$, at the invisible distance d1. A stepwise profile of the transparency factor $\alpha$ is defined in this way, so that a will step up discretely as the distance from the eye point 201 to the object is increased. The same profile is used to reduce the transparency factor $\alpha$ as the object distance is decreased.

While two examples of transparency profiles have been explained in FIGS. 7 and 18, it is not intended to limit the invention to any particular types of profiles. As still another example, suppose that the system has a semi-transparent object to display. In this case, the object has to be rendered, not in opaque mode, but with its inherent transparency factor when its distance is below the semi-transparent distance d0. If the distance d from the eye point exceeds the semi-transparent distance d0, the transparency factor is increased up to one.

The present invention can be applied to both motion videos (as have been discussed so far) and still pictures. In the latter case, distant objects would look semi-transparent or invisible in a resultant still picture.

The object database in the above-described embodiment stores transparency parameters, one set for each individual object. Alternatively, the object database may have a common set of parameters applicable to all objects. Another alternative arrangement is to divide given objects into several groups and define transparency parameters for each group of objects.

The proposed processing mechanisms are actually implemented as software functions of a computer system, the instructions being encoded and provided in the form of computer programs. The computer system executes these programs to provide the intended functions of the present invention. Such programs are stored in a computer-readable medium for the purpose of storage and distribution. Suitable computer-readable storage media include magnetic storage media, optical discs, magneto-optical storage media, and solid state memory devices. Magnetic storage media include hard disk drives (HDD), flexible disks (FD), and magnetic tapes. Optical discs include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are particularly suitable for the circulation of the programs. Network-based distribution of software programs is also possible, in which the client program files stored in a server computer are downloaded to client computers via the network.

The computer stores the programs in its local storage unit, which have been previously installed from a portable storage media or downloaded from a server computer. The computer provides intended functions by executing those programs read out of its local storage unit. As an alternative way of program execution, the computer may execute the programs directly from the portable storage media. Another alternative method is that a server computer supplies the computer with necessary programs dynamically, allowing the computer to execute them upon delivery.

The above discussion is summarized as follows. According to the present invention, a given object is displayed with different transparency values, depending on its distance from the eye point. That is, the object is displayed in opaque mode when the distance is shorter than a predetermined semi-transparent distance; in semi-transparent mode until the distance reaches a predetermined invisible distance; and in invisible mode when the distance exceeds the invisible distance. Here, the semi-transparent mode serves as an intermediary visibility state of an object that is moving away from the eye point, thus enabling the object to disappear from the sight smoothly and continuously.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a program for drawing and displaying an image of given objects in a three-dimensional virtual space, the program causing a computer to perform the steps of:
    (a) calculating distance from an eye point to an object based on coordinates thereof in the three-dimensional virtual space;
    (b) comparing the distance with a predetermined semi-transparent distance, as well as with a predetermined invisible distance which is longer than the semi-transparent distance;
    (c) selecting the object as a visible object that is to be subjected to image drawing operations when the distance of the object is shorter than the invisible distance;
    (d) drawing an image of the visible object, in opaque mode when the distance is shorter than the semi-transparent distance, and in semi-transparent mode with transparency given by a monotonically increasing function of the distance when the distance is longer than the semi-transparent distance; and
    (e) displaying the image of the visible object drawn at the drawing step, the object being displayed as an opaque object when the object is drawn in the opaque mode and the object being displayed as a semi-transparent object when the object is drawn in the semi-transparent mode.

2. The computer-readable medium according to claim 1, wherein:
    the drawing step (d) determines the transparency of the visible object, based on the distance, when drawing the image in semi-transparent mode; and
    the transparency is raised as the distance increases.

3. The computer-readable medium according to claim 1, wherein the drawing step (d) varies the transparency of the visible object continuously according to the distance, when drawing the image in semi-transparent mode.

4. The computer-readable medium according to claim 1, wherein the drawing step (d) varies the transparency of the visible object in a stepwise manner according to the drawing the image in semi-transparent mode.

5. An apparatus for drawing and displaying an image of given objects in a three-dimensional virtual space, comprising:
    calculating means for calculating distance from an eye point to an object based on coordinates thereof in the three-dimensional virtual space;
    comparing means for comparing the distance with a predetermined semi-transparent distance, as well as with a predetermined invisible distance which is longer than the semi-transparent distance;
    drawing means for selecting the object as a visible object that is to be subjected to image drawing operations if the distance is shorter than the invisible distance, and drawing an image of the visible object in opaque mode if the distance is shorter than the semi-transparent distance, and in semi-transparent mode with transparency given by a monotonically increasing function of the distance when the distance is longer than the semi-transparent distance; and
    displaying means for displaying the image of the visible object drawn by the drawing means,
    wherein the object is displayed as an opaque object when the object is drawn in the opaque mode, and the object is displayed as a semi-transparent object when the object is drawn in the semi-transparent mode.

6. The apparatus according to claim 5, wherein:
    the semi-transparent distance and the invisible distance are defined as parameters for each of the given objects; and
    the comparing means processes the given objects with reference to the respective semi-transparent distance and invisible distance parameters.

7. The apparatus according to claim 5, wherein the drawing means varies the transparency of the visible object continuously according to the calculated distance, when drawing the image in semi-transparent mode.

8. The apparatus according to claim 5, wherein the drawing means varies the transparency of the visible object in a stepwise manner according to the calculated distance, when drawing the image in semi-transparent mode.

9. A method of drawing and displaying an image of given objects in a three-dimensional virtual space, comprising the steps of:
    (a) calculating distance from an eye point to an object based on coordinates thereof in the three-dimensional virtual space;
    (b) comparing the distance with a predetermined semi-transparent distance, as well as with a predetermined invisible distance which is longer than the semi-transparent distance;
    (c) selecting the object as a visible object that is to be subjected to image drawing operations when the distance of the object is shorter than the invisible distance;

(d) drawing an image of the visible object, in opaque mode when the distance is shorter than the semi-transparent distance, and in semi-transparent mode with transparency given by a monotonically increasing function if the distance when the distance is longer than the semi-transparent distance; and (e) displaying the image of the visible object drawn at the drawing step, the object being displayed as an opaque object when the object is drawn in the opaque mode, and the object being displayed as a semi-transparent object when the object is drawn in the semi-transparent mode.

10. A method of drawing an object in a three-dimensional virtual space, comprising:

determining whether the object is an object to be drawn by comparing a distance of the object from an eye point to an invisible threshold distance, the object being an object to be drawn when the distance is less than the invisible threshold distance, the distance being calculated based on coordinates thereof in the three-dimensional virtual space;

drawing the object opaquely when the object is an object to be drawn and the distance is less than a semi-transparent threshold distance;

drawing the object semi-transparently with transparency given by a monotonically increasing function of the distance when the object is an object to be drawn and the distance is greater than a semi-transparent threshold distance; and displaying the object as an opaque object when the object is drawn opaquely, and displaying the object as a semi-transparent object when the object is drawn semi-transparently.

11. A computer-readable medium storing a program which draws and displays an image of given objects in a three-dimensional virtual space, the program causing a computer to perform the steps of:

determining whether the object is an object to be drawn by comparing a distance of the object from an eye point to an invisible threshold distance, the object being an object to be drawn when the distance is less than the invisible threshold distance, the distance being calculated based on coordinates thereof in the three-dimensional virtual space;

drawing the object opaquely when the object is an object to be drawn and the distance is less than a semi-transparent threshold distance;

drawing the object semi-transparently with transparency given by a monotonically increasing function of the distance when the object is an object to be drawn and the distance is greater than a semi-transparent threshold distance; and displaying the object as an opaque object when the object is drawn in the opaque mode, and displaying the object as a semi-transparent object when the object is drawn in the semi-transparent mode.

12. A method of drawing an object in a three-dimensional virtual space, comprising:

drawing the object opaquely when a distance from an eye point to the object is less than a first threshold distance, the distance being calculated based on coordinates thereof in the three-dimensional virtual space;

drawing the object semi-transparently with transparency given by a monotonically increasing function of the distance when the distance is between the first threshold distance and a second threshold distance, the second threshold distance being greater than the first threshold; and displaying the object as an opaque object when the object is drawn opaquely, and displaying the object as a semi-transparent object when the object is drawn semi-transparently.

13. A computer-readable medium storing a program which draws and displays an image of given objects in a three-dimensional virtual space, the program causing a computer to perform the steps of:

drawing the object opaquely when a distance from an eye point to the object is less than a first threshold distance, the distance being calculated based on coordinates thereof in the three-dimensional virtual space;

drawing the object semi-transparently with transparency given by a monotonically increasing function of the distance when the distance is between the first threshold distance and a second threshold distance, the second threshold distance being greater than the first threshold; and displaying the object as an opaque object when the object is drawn opaquely, and displaying the object as a semi-transparent object when the object is drawn semi-transparently.

14. A method of drawing and displaying an object in a three-dimensional virtual space, comprising:

determining the domain in which the object resides based on a distance from an eye point to the object, the distance calculated based on coordinates thereof in the three-dimensional virtual space;

drawing the object according to the determined domain with at least a first domain wherein objects are drawn opaquely, a second domain wherein objects are drawn semi-transparently with transparency given by a monotonically increasing function of the distance, and a third domain wherein objects are not drawn; and displaying the object as an opaque object when the object is drawn opaquely, and displaying the object as a semi-transparent object when the object is drawn semi-transparently.

15. A computer-readable medium storing a program which draws and displays an image of given objects in a three-dimensional virtual space, the program causing a computer to perform the steps of:

determining the domain in which the object resides based on a distance from an eye point to the object, the distance calculated based on coordinates thereof in the three-dimensional virtual space;

drawing the object according to the determined domain with at least a first domain wherein objects are drawn opaquely, a second domain wherein objects are drawn semi-transparently with transparency given by a monotonically increasing function of the distance, and a third domain wherein objects are not drawn; and displaying the object as an opaque object when the object is drawn opaquely, and displaying the object as a semi-transparent object when the object is drawn semi-transparently.

* * * * *

UNITED STATES PATENT AND TRADEMARK OFFICE
CERTIFICATE OF CORRECTION

| | | |
|---|---|---|
| PATENT NO. | : 7,057,625 B2 | Page 1 of 1 |
| APPLICATION NO. | : 09/968520 | |
| DATED | : June 6, 2006 | |
| INVENTOR(S) | : Seiichi Kamata et al. | |

It is certified that error appears in the above-identified patent and that said Letters Patent is hereby corrected as shown below:

On Title Page, Item (57), Col. 2, in the "OTHER PUBLICATIONS", line 5, change "modes" to --model--; and in the "(74)" section, change "Stass & Halsey LLP" to --Staas & Halsey LLP--.

Column 13, line 47, change "calculating" to --calculating a--; and
        line 65, change "mode" to --mode,--.
Column 14, line 18, change "calculating" to --calculating a--;
        line 26, change "operations if" to --operating when--;
        line 29, change "if the" to --when the--; and
        line 58, change "calculating" to --calculating a--.
Column 15, line 5, change "function if" to --function of--.

Signed and Sealed this

Twenty-ninth Day of August, 2006

JON W. DUDAS
*Director of the United States Patent and Trademark Office*